United States Patent [19]
Pestka

[11] 3,880,063
[45] Apr. 29, 1975

[54] SPRING DRAG DEVICE FOR POP-UP TOASTER

[75] Inventor: John A. Pestka, Park Ridge, Ill.

[73] Assignee: Illinois Tool Works Inc., Chicago, Ill.

[22] Filed: Jan. 21, 1974

[21] Appl. No.: 435,281

[52] U.S. Cl. ............ 99/329 R; 99/391; 99/393
[51] Int. Cl. .................................... A47j 37/08
[58] Field of Search........... 99/329, 326, 327–328, 99/331–332, 333, 385, 388–389, 390–391, 392–393

[56] References Cited
UNITED STATES PATENTS

| | | | |
|---|---|---|---|
| 2,666,380 | 1/1954 | Badenoch | 99/329 R |
| 2,800,070 | 7/1957 | Olson et al. | 99/329 R |
| 2,849,946 | 9/1958 | Palmer | 99/329 R X |
| 3,029,725 | 4/1962 | Parr | 99/329 R |
| 3,140,650 | 7/1964 | Woron | 99/329 R |
| 3,169,469 | 2/1965 | Parr | 99/385 X |
| 3,253,535 | 5/1966 | Chivers | 99/329 R |
| 3,361,053 | 1/1968 | Jepson et al. | 99/329 R |

*Primary Examiner*—Harvey C. Hornsby
*Assistant Examiner*—Arthur O. Henderson
*Attorney, Agent, or Firm*—Olson, Trexler, Wolters, Bushnell & Fosse, Ltd.

[57] ABSTRACT

The embodiment of the invention disclosed herein is directed to a spring drag device for a pop-up toaster that has one or more slots formed in the top wall to receive slices of bread. The pop-up mechanism includes a guide post positioned adjacent the slots formed in the toaster to vertically guide a bread-receiving support member which extends from the guide post. The bread-receiving support means is spring-biased upwardly so that when a release mechanism is energized when the toast is adequately browned, the bread support means is urged upwardly. To prevent abrupt upward motion of the toast, a spring drag device is secured to the guide post for increasing the friction between the bread-receiving support means and the guide post when the spring urges the bread upwardly. The spring drag device is formed of a single strip of metal having oppositely directed guide post gripping portions which freely slidably engage the guide post when bread is pushed downwardly into the slots and which grippingly slidably engage the guide post when the bread is urged upwardly by the spring means.

10 Claims, 9 Drawing Figures

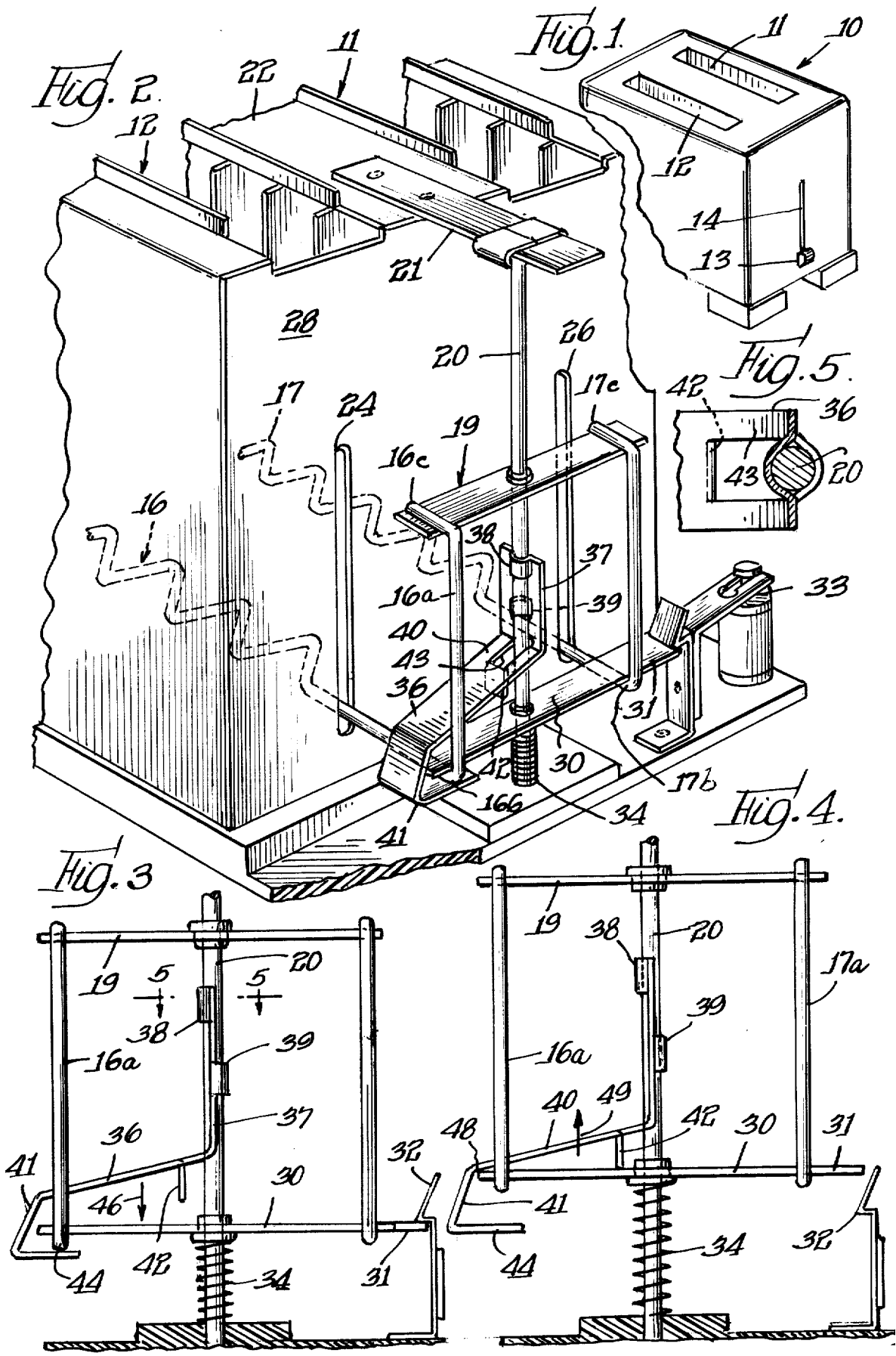

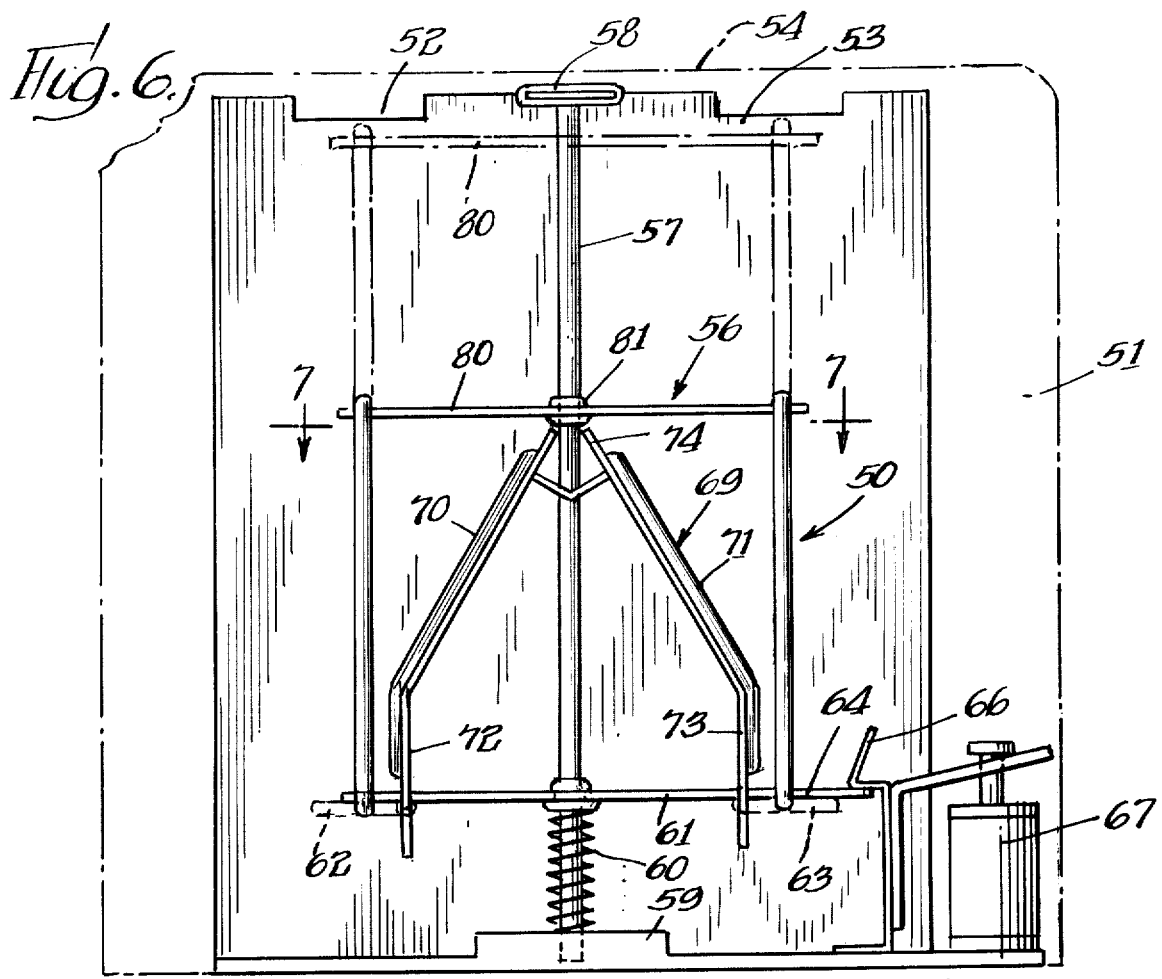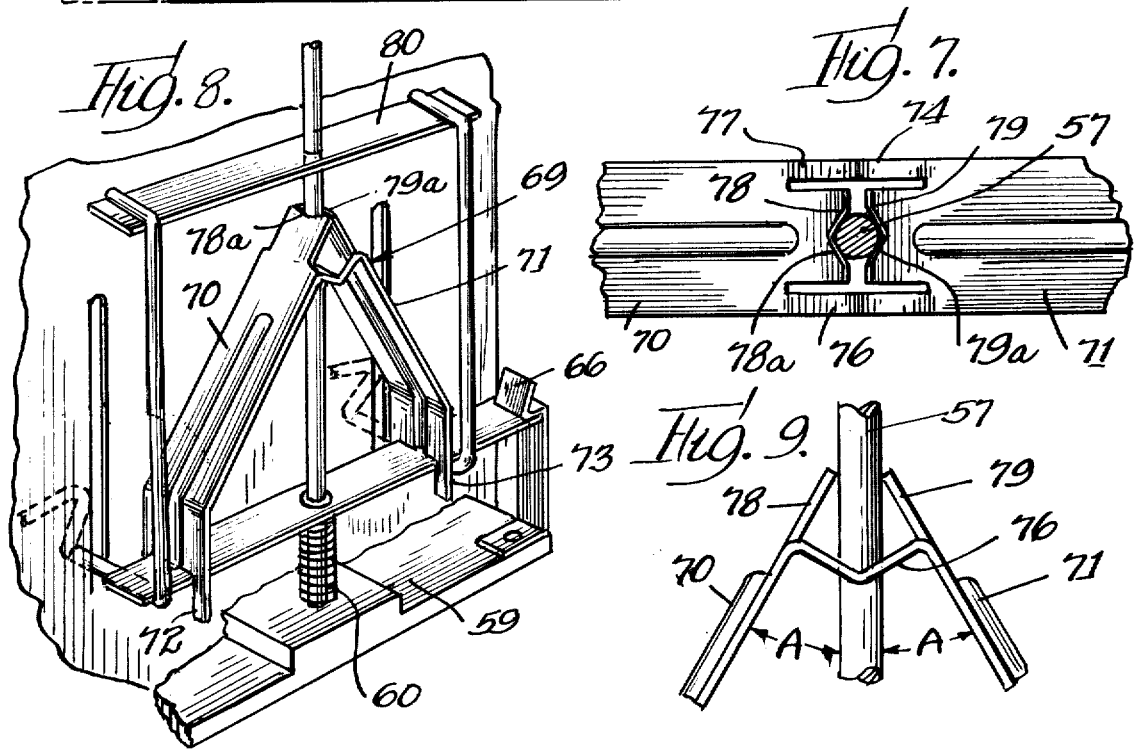

3,880,063

SPRING DRAG DEVICE FOR POP-UP TOASTER

BACKGROUND OF THE INVENTION

This invention relates generally to pop-up toasters, and more particularly to a spring drag device for reducing the rate of upward motion of the bread when moved under the force of spring means.

Heretofore, pop-up toasters have incorporated automatic sensing means for determining the condition of browning of the toast, which sensing means releases the toast platform or bread-receiving support means so that the toast can be urged upwardly when properly toasted. Such prior art toasters often include a thermal sensing latch mechanism which engages a platform or bread-receiving support member to hold the same in a lowered condition during the toasting operation. This bread-receiving support member may also include an electrical switch which energizes the heating elements by a source of energizing current only when the toast mechanism is in a lowered position. When the toast is sufficiently browned, the latch mechanism releases the bread support member and the bread is urged smartly upwardly under the force of spring means.

Many prior art toasters incorporate means for raising the toast slowly upwardly through the slots so that the toast is not inadvertently ejected from the top of the toaster. However, such prior art mechanisms are relatively complex in design and expensive in that they require substantial numbers of components, and in some cases may require the use of small electrical motors, or the like. If the toast is allowed to be urged upwardly solely by the force of a spring element, it may eject the toast completely out of the toaster.

SUMMARY OF THE INVENTION

Accordingly, it is an object of this invention to provide a pop-up toaster which has a control mechanism for gradually raising the toast through the slots after the toasting operation.

Another object of this invention is to provide a spring drag mechanism for a pop-up toaster which is inexpensive and simple to manufacture while maintaining a high degree of reliability and efficiency in operation.

Another object of this invention is to provide a spring drag mechanism for a pop-up toaster which has a minimum number of moving components so that the mechanism provides reliable operation for long periods of use.

A feature of the present invention is the provision of a control member which is formed of a metal stamping and which has oppositely directed guide post stripping portions formed at one end and an arm extending therefrom to urge the gripping portions apart for loosely sliding upon the guide post when toast is lowered into the toaster and for firmly sliding upon the guide post when toast is urged upwardly as the result of spring bias.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a fragmentary perspective view of a pop-up toaster incorporating the spring drag mechanism of this invention;

FIG. 2 is a fragmentary perspective view illustrating the internal working mechanism of the toaster of FIG. 1;

FIG. 3 is an end view of the spring drag mechanism constructed in accordance with this invention and illustrating the operation thereof when toast is lowered into the toaster;

FIG. 4 illustrates an end view of the spring drag mechanism of this invention when toast is raised as the result of spring bias;

FIG. 5 is a sectional view taken along line 5—5 of FIG. 3;

FIG. 6 illustrates an end view of an alternate form of spring drag mechanism constructed in accordance with the principles of this invention;

FIG. 7 is a top sectional view taken along line 7—7 of FIG. 6;

FIG. 8 is a fragmentary perspective view illustrating the cooperation of the spring drag mechanism with the vertical guide post of the pop-up toaster; and FIG. 9 is an enlarged fragmentary view illustrating the spring drag mechanism engaging the vertical guide post in accordance with the principles of this invention.

DETAILED DESCRIPTION OF THE ILLUSTRATED EMBODIMENTS

Referring first to FIG. 1, there is seen a pop-up toaster constructed in accordance with the principles of this invention and designated generally by reference numeral 10. The toaster 10 has a pair of parallel spaced apart slots 11 and 12 through which slices of bread are inserted and toasted within the toaster. The toaster includes a lever 13 located at one side thereof and extends through a vertical slot 14 to engage a raising and lowering mechanism within the toaster. As is the case with all pop-up toasters, slices of bread are initially inserted into the slots 11 and 12 and the toaster is energized when the lever 13 is pushed downwardly to lower the bread and to engage suitable switching mechanisms within the toaster for connecting the heating elements to a source of energizing current.

To better understand the aspects of the present invention, reference is now made to FIG. 2 which more clearly illustrates one form of spring drag mechanism constructed in accordance with the principles of this invention. Here the slots 11 and 12 are provided with bread-receiving support members 16 and 17 which extend along the length of the slot and form a platform for lowering and raising the bread within the toaster. The bread-receiving support members 16 and 17 are provided with upstanding bent portions 16a and 17a to engage guide means 19 slidably secured to a vertical guide post 20. The guide post 20 is held in position relative to the slots 11 and 12 by a support arm 21 extending from the top wall portion 22 of the toaster. The vertical guide rod 20 is secured to the arm 21 by a metal strap 23 which clamps the arm, and which may be secured thereto by spot welding, rivets, or screws.

The bread-receiving support means 16 and 17 are here illustrated as a zigzag bent rigid wire member. However, it will be understood that other suitable platform or other bread-receiving support means may be incorporated such as a flat strip of metal or the like. The bread-receiving support means 16 and 17 have the bent-up portions 16a and 17a secured to the slide means 19 by spot welding or the like at the bottom portions 16b and 17b and the top portions 16c and 17c. The bent portions 16b and 17b pass through slots 24 and 26, respectively, of an end wall 28 of the toaster 10. The guide means 19 is formed of an upper strap member 29 and a lower strap member 30 which extend transversely of the direction of the slots 11 and 12. The lower strap member 30 has an end portion 31 engageable with a latch hook member 32 which, in turn, is connected to a suitable release mechanism 33. When the toast is of the desired color or temperature, the release mechanism 33 will urge the latch member 32 out of engagement with the portion 31 of the strap member 30 and a spring bias member 34 will urge the slide member 19 upwardly along the guide post 20. This action will also raise the bread-receiving support members 16 and 17 and raise the toast through the slots 11 and 12.

In accordance with this invention, the rate of upward movement of the slide member 19 is controlled by an upward-motion control member 36 which has a vertical portion 37 provided with oppositely directed C-shaped bent portions 38 and 39 to engage opposite sides of the vertical guide post 20. Extending angularly downwardly from the vertical portion 37 is a resilient portion 40 which has a C-shaped end portion 41 engaging the top and bottom portions of the bottom strap member 30. A downwardly directed tab member 42 forms an opening 43 which provides for sufficient clearance of the guide post 20 when the angled downwardly portion 40 is bent when toast is being lowered into the toaster.

The operation of the upward-motion control member 36 is best illustrated by reference to FIGS. 3 and 4. Here it can be seen that downward motion of the lower strap member 30 engages the inwardly turned portion 44 of the C-shaped end 41 and thereby somewhat resiliently bends the arm portion 40 in the direction of the arrowed line 46. This action will cause the oppositely directed C-shaped portions 38 and 39 to be urged away from engagement with the vertical guide post 20. When the latch mechanism 32 disengages the end portion 31, the spring member 34 will urge the entire guide assembly 19 upwardly. This will cause the lower strap member 30 to engage the top portion 48 of the control member 36 and resiliently urge it upwardly in the direction of the arrowed line 49. This will cause the oppositely directed C-shaped portions 38 and 39 firmly to grip and engage the vertical guide post. The coefficient of friction between the guide post and the portions 38 and 39 is such that spring member 34 will urge the entire guide assembly 19 upwardly at a relatively slow rate. This action will insure that the toast will not be ejected from the slots 11 and 12.

Referring now to FIGS. 6, 7, 8 and 9, there is seen an alternate embodiment of a spring drag mechanism constructed in accordance with the principles of this invention that is designated generally by reference numeral 50. Here, the toaster configuration is indicated in phantom lines and designated by reference numeral 51 and is to be considered substantially the same as the toaster construction of FIGS. 1 and 2. Slots 52 and 53 are formed in the top wall 54 of the toaster and slices of bread are inserted therein and lowered to a toasting position by lowering a slide assembly 56. The slide assembly 56 rides upon a vertical guide post 57 which is fixedly secured by a clamp 58 at the top thereof and inserted into a base member 59 at the bottom thereof. Spring means 60 is positioned between the base member 59 and a lower strap member 61 of the slide 56. The strap member 61 extends transversely of the slots 52 and 53 and is connected, either by welding or the like to bread-receiving support means 62 and 63. One end 64 of the strap member 61 engages a latch mechanism 66 which, in turn, is connected to an automatic release device 67. The release device 67 may be responsive to either relative brownness of the toast being toasted or a predetermined temperature setting which will correspond to a browned condition of the toast.

Most advantageously, upward-motion control means 69 is formed of a pair of downwardly sloping portions 70 and 71 leading into perpendicular downwardly directed portions 72 and 73, respectively. The apex 74 of the motion control device 69, as best seen in FIG. 7, is formed having marginal bent portions 76 and 77 and a pair of spaced apart gripping portions 78 and 79. The gripping portions 78 and 79 engage the guide post 57 in such a manner as to provide a relatively loose slide fit as the slide member 56 is urged downwardly when toast is being inserted into the toaster. However, upon release of the latch 66 from the end 64 of the lower strap 61, the strap 61 urges upwardly against the arm members 70 and 71 to force the gripping portions 78 and 79 together about the slide post 57. This will apply substantial drag to the slide assembly 56 and raise the entire assembly, including the bread engaging the bread support means 62 and 63, at a relatively low rate.

Referring to FIG. 8, the details of the vertical downwardly directed portions 72 and 73 are shown. Here a C-shaped configuration is provided to straddle the strap member 61 and maintain the entire motion control mechanism 69 in alignment therewith. Also it can be seen that the gripping portions 78 and 79 may be provided with notches 78a and 79a to increase the surface area in contact with the vertical guide post 57.

In operation, the slide assembly 56 has a top strap member 80 thereof positioned parallel to the bottom strap member 61. The top strap member may have a central grommet or guide 81 through which the guide post 57 passes. The strap 80 urges downwardly at the apex 74 and pushes the entire upward-motion control assembly 69 downwardly with a minimum of force. However, upward motion, as the result of spring bias member 60, applies forces to the bottom arm members 72 and 73 which, in turn, flex the apex to bring the gripping portions 78 and 79 in firm gripping contact with the guide post 57.

As best seen in FIG. 9, the relatively angular displacement of the declining arm members 70 and 71 is such that the angle A between the arm portions and the axis passing through the guide post 57 is in the order of about thirty degrees. However, it will be understood that other angular configurations such as fifteen to eighty degrees, more or less, may be incorporated.

In the embodiment disclosed in FIGS. 1–5, the overall length of the tab member 42 with regard to the top portion of the C-shaped end portion 41 will control or limit the amount of spring drag produced by the C-shaped portions 38 and 39. Since the amount of spring drag is determined by the amount of flexure or bending of the arm portion 40, the tab 42 will limit this bending action. If the overall length of the tab 42 is made adjustable, then the amount of spring drag is made adjustable. Hence, more spring drag can be selected for lighter objects and less spring drag can be selected for heavier objects.

While only two specific embodiments of the present invention have been illustrated herein, it will be understood that variations and modifications may be effected without departing from the spirit and scope of the novel concepts disclosed and claimed herein.

The invention is claimed as follows:

1. In a pop-up toaster having one or more slots formed in a top wall thereof thorugh which slices of bread are lowered to be placed between spaced apart heating elements, the combination comprising: guide post means positioned adjacent said slots, bread-receiving support means extending along the length of the slots to receive the slices of bread and lower the bread to a toasting position, slide means fixedly secured to said bread-receiving support means and slidably secured to said guide post means, spring bias means engageable with said slide means for urging said slide means and said bread-receiving support means upwardly when the bread is toasted, latch means engageable with said slide means for holding said slide means and said bread-receiving support means in a lowered position during toasting of the bread slices, release means operably connected to said latch means to cause said latch means to release said slide means so that said spring bias means will raise the toasted bread, and upward-motion control means formed of a member having a guide post gripping portion and an arm portion resiliently coupled thereto and extending therefrom to be urged in one direction by said slide means to release said guide post gripping portion from engagement with said guide post during lowering of toast and to be urged in another direction by said slide means to slidably grip said guide post when toast is being raised by said spring bias means, whereby the toasted bread is raised in a uniform smooth manner through the slots formed in the top wall of the toaster.

2. In the pop-up toaster as set forth in claim 1 wherein said guide post means is formed of a vertical rod positioned adjacent the slots, and wherein said upward motion control means is formed of a metal strap member having semicircular spaced apart bend portions formed therein to be placed on opposite sides of the vertical rod for gripping the same when said arm portion is urged upwardly.

3. In the pop-up toaster as set forth in claim 2 wherein said slide means has horizontally disposed vertically spaced apart arm members extending perpendicular to said bread-receiving support means and located adjacent thereto and extending on opposite sides of said vertical rod, one of said horizontal members engaging said arm portion of said upward-motion control means for bending the same and urging said semicircular portions into gripping contact with said vertical rod, and the other end of said one of said horizontal members engaging said latch means.

4. In the pop-up toaster as set forth in claim 1 wherein said upward-motion control means is formed of a strip of metal having semicircular portions extending in opposite directions from the surfaces thereof to engage said guide post means at spaced apart locations, said strip of metal having a bent portion adjacent said semicircular portions and leading into an angularly disposed portion engageable with said slide means, said angularly disposed portion leading into a C-shaped end portion engaging the top and bottom of said slide means for causing slidable engagement of said semicircular portions with said guide post means when said slide means is lowered and for causing gripping engagement of said semicircular portions with said guide post means when said slide means is raised by said spring bias means.

5. In the pop-up toaster as set forth in claim 4 wherein said guide post means is formed of a vertical rod for receiving said semicircular portions of said strip of metal.

6. In the pop-up toaster as set forth in claim 1 wherein said upward-motion control means is formed of a pair of downwardly angularly directed members having the bottom portions thereof engaging said slide means and the top portion thereof loosely slidably engageable with said guide post means when toast is lowered into the toaster and for firmly slidably engaging said guide post means when toast is being raised by said spring bias means.

7. In the pop-up toaster as set forth in claim 6 wherein said pair of downwardly angularly directed members are formed as an integral member having oppositely directed spring-forming connecting portions located at the apex of the angles formed therebetween and through which apex passes said guide post means.

8. In the pop-up toaster as set forth in claim 7 wherein said downwardly angularly directed members have the bottom portions thereof C-shaped in configuration to form a saddle over said slide means so as to maintain said downwardly angularly directed members in substantial perpendicular alignment with respect to said bread-receiving support means.

9. In the pop-up toaster as set forth in claim 1 wherein said arm portion of said upward-motion control means includes tab means of predetermined length engageable with said slide means to limit the amount of flexure of said arm portion in said another direction to thereby limit the amount of gripping action of said gripping portion upon said guide post means.

10. In the pop-up toaster as set forth in claim 9 wherein said predetermined length of said tab means is adjustable.

* * * * *